(12) United States Patent
Presi et al.

(10) Patent No.: US 8,909,050 B2
(45) Date of Patent: Dec. 9, 2014

(54) PASSIVE OPTICAL NETWORKS

(75) Inventors: Marco Presi, Pisa (IT); Ernesto Ciaramella, Rome (IT); Fabio Cavaliere, Vecchiano (IT); Luca Banchi, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 543 days.

(21) Appl. No.: 12/994,239

(22) PCT Filed: May 11, 2010

(86) PCT No.: PCT/EP2010/056456
§ 371 (c)(1),
(2), (4) Date: Oct. 28, 2011

(87) PCT Pub. No.: WO2011/134536
PCT Pub. Date: Nov. 3, 2011

(65) Prior Publication Data
US 2012/0033295 A1  Feb. 9, 2012

(30) Foreign Application Priority Data

Apr. 30, 2010 (EP) .................................... 10161606

(51) Int. Cl.
*H04J 14/00* (2006.01)
*H04L 27/20* (2006.01)
*H04B 10/2587* (2013.01)

(52) U.S. Cl.
CPC ........ *H04L 27/2096* (2013.01); *H04B 10/2587* (2013.01)
USPC ................. 398/72; 398/67; 398/66; 398/188; 398/199

(58) Field of Classification Search
CPC . H04J 14/025; H04J 14/0226; H04J 14/0252; H04J 14/02; H04J 14/08; H04J 14/0246; H04J 14/0247; H04J 14/0282; H04J 14/0227; H04J 2014/0253; G02F 2203/70; G02F 1/3515
USPC .......... 398/63, 66, 67, 71, 72, 168, 212, 188, 398/199
See application file for complete search history.

(56) References Cited

U.S. PATENT DOCUMENTS 7,679,819 B2 *  3/2010  Kim et al. ..................... 359/344
8,023,824 B2 *  9/2011  Yu et al. .......................... 398/72

(Continued)

OTHER PUBLICATIONS

A 80 km reach fully passive WDM-PON based on reflective ONUs, Marco Presi1, Roberto Proietti1, Kamau Prince1,2, Giampiero Contestabile1, and Ernesto Ciaramella1 © Received Jul. 22, 2008; revised Oct. 10, 2008; accepted Oct. 19, 2008; published Nov. 4, 2008.*

(Continued)

*Primary Examiner* — Daniel Washburn
*Assistant Examiner* — Hibret Woldekidan
(74) *Attorney, Agent, or Firm* — Baker Botts, LLP

(57) ABSTRACT

An optical network unit (10) comprising a reflective semiconductor optical amplifier (R-SOA) 12 and a driver 14. The R-SOA has a large optical confinement factor and is arranged to receive a portion of a downstream optical signal having a signal wavelength and a signal power. The driver is arranged to generate a drive signal 16 to drive the R-SOA. The drive signal is arranged to cause the R-SOA to operate in saturation at the signal power. The drive signal is further arranged to cause the R-SOA to apply a return-to-zero line code to said portion of the downstream optical signal to form an upstream optical signal at the signal wavelength. The drive signal is further arranged to cause the R-SOA to apply a phase modulation to the upstream optical signal.

15 Claims, 6 Drawing Sheets

(56) References Cited

U.S. PATENT DOCUMENTS

| | | | |
|---|---|---|---|
| 8,478,125 B2* | 7/2013 | Calabretta et al. | 398/87 |
| 8,620,159 B2* | 12/2013 | Presi et al. | 398/72 |
| 8,649,682 B2* | 2/2014 | Presi et al. | 398/72 |
| 2008/0187314 A1* | 8/2008 | Chung et al. | 398/72 |
| 2008/0279556 A1* | 11/2008 | Yu et al. | 398/72 |
| 2009/0116848 A1* | 5/2009 | Kim et al. | 398/140 |
| 2011/0008057 A1* | 1/2011 | Gervais et al. | 398/188 |
| 2011/0013270 A1* | 1/2011 | Tanaka | 359/344 |
| 2011/0188859 A1* | 8/2011 | Wen et al. | 398/79 |
| 2011/0236021 A1* | 9/2011 | Presi et al. | 398/67 |
| 2012/0321316 A1* | 12/2012 | Presi et al. | 398/67 |

OTHER PUBLICATIONS

Remodulation of a subcarrier modulated signal by Feed-Forward current Injection in a Reflective SOA M. Presi1, A. Chiuchiarelli1, R. Proietti1, G. Contestabile1, E. Ciaramella1, © 2009 IEEE.*

Experimental demonstration of 10 Gbit/s upstream transmission by remote modulation of 1 GHz RSOA using Adaptively Modulated Optical OFDM for WDM-PON single fiber architecture.T. Duong1, N. Genay1, P. Chanclou1, B. Charbonnier1, A. Pizzinat1, R. Brenot2, © Sep. 2008.*

10-Gb/s Operation of RSOA for WDM PON Using Return-to-Zero Modulation Format, K. Y. Cho and Y. C. Chung © 2012.*

Compact Wireless Access Nodes for WDM BidirectionalRadio-over-Fiber System Based on RSOA Xianbin Yu, T. B. Gibbon, I. Tafur Monroy, © 2009.*

Single RSOA Based ONU for RZ Symmetrical WDM PON at 2.5 GB/s. Fresi et al. © Date of Conference: Aug. 4-7, 2008.*

First Demonstration of PPLN+RSOA-based Tunable All-Optical © Sep. 16-20, 2007.*

10 Gb/s RSOA Transmission by Direct Duobinary Modulation. © Sep. 21-25, 2008.*

* cited by examiner

PASSIVE OPTICAL NETWORKS

This application is the U.S. national phase of International Application No. PCT/EP2010/056456 filed 11 May 2010 which designated the U.S. and claims priority to EP 10161606.8 filed 30 Apr. 2010, the entire contents of each of which are hereby incorporated by reference.

TECHNICAL FIELD

The invention relates to an optical network unit, a passive optical network comprising the optical network unit, and a method of transmitting data in a passive optical network.

BACKGROUND

Wavelength division multiplexing (WDM) in passive optical networks (PON) dramatically increases the fibre link capacity compared with other fibre access techniques, especially if the same optical carrier is used for both downstream and the upstream signals propagating in the same fibre. WDM PON systems that reuse the same wavelength for both downlink and uplink transmission allow the system capacity and number of users to be doubled as compared to a WDM PON where a pair of wavelengths are used for each bidirectional channel. However, reusing the same wavelength for upstream transmission requires the downstream data modulation to be removed before applying the upstream data. This leads to an additional power penalty on the upstream signal, caused by residual downstream modulation and optical reflections along the optical link.

One solution uses a reflective semiconductor optical amplifier (RSOA) as a colourless transmitter at the optical network unit (ONU). Part of the downstream signal is tapped and sent to the RSOA input. If the power of the tapped signal is sufficiently high (typically greater than −10 dBm) it saturates the RSOA, cleaning the downstream modulation so that the upstream data can be applied to the RSOA electrical input. This solution faces the problem that the high input optical power needed to saturate the RSOA limits the achievable span budget in practical systems, giving the PON a typical reach of less than 5 km.

In a second solution, the downstream traffic is FSK (Frequency Shift Key) modulated by using a directly modulated laser diode, properly biased in order to have small residual amplitude modulation and a sharp chirp response, to maximize the frequency shift caused by any driving current variation. At the ONU, the received signal is split in two parts: one part is sent to an optical filter in front of the downstream receiver while the other part is used as optical carrier by the upstream data, and is remodulated with upstream data by an RSOA. The function of the filter is to convert the FSK modulation format into an ASK (Amplitude Shift Keying) format. This is achieved by positioning the optical carrier frequency on one of slope edges of the optical filter. A similar scheme exploits DPSK (Differential Phase Shift Keying) modulation instead of FSK: this requires a phase modulator at the downstream transmitter and an interferometer in place of the optical filter for ASK conversion. The cost of the filter or interferometer in these arrangements is a disadvantage, and additional elements are required to provide thermal control of the filter or dedicated circuitry to track any drift of the downstream optical carrier.

A further solution, reported by Presi et al, "A 80 km reach fully passive WDM-PON based on reflective ONUs", Optics Express, vol. 16, no. 23, pp 19043-19048, 10 Nov. 2008, uses RZ (Return to Zero) and IRZ (Inverse Return to Zero) modulation formats for upstream and downstream transmission, respectively. An RSOA at the ONU remodulates and amplifies a seed portion of a received downstream IRZ signal to generate an RZ upstream data signal. The RSOA is operated outside of the saturation regime, which, together with using the IRZ/RZ line coding pair, increases the power budget and thus the maximum achievable reach of the PON.

SUMMARY

It is an object to provide an improved optical network unit. It is a further object to provide an improved passive optical network. It is a further object to provide an improved method of transmitting data in a passive optical network.

A first aspect of the invention provides an optical network unit comprising a reflective semi-conductor optical amplifier and a driver. The reflective semi-conductor optical amplifier has a large optical confinement factor and is arranged to receive a portion of a downstream optical signal having a signal wavelength and a signal power. The driver is arranged to generate a drive signal to drive the reflective semi-conductor optical amplifier. The drive signal is arranged to cause the reflective semi-conductor optical amplifier to operate in saturation at the signal power. The drive signal is further arranged to cause the reflective semi-conductor optical amplifier to apply a return-to-zero line code to said portion of the downstream optical signal to form an upstream optical signal at the signal wavelength. The drive signal is further arranged to cause the reflective semi-conductor optical amplifier to apply a phase modulation to the upstream optical signal.

Driving the reflective semiconductor optical amplifier to apply a phase modulation to the upstream optical signal reduces the coherence time of the upstream optical signal. Any reflections, such as Rayleigh back-scattering, generated in an optical link in which the downstream and upstream optical signals propagate will therefore interfere incoherently with the downstream and upstream optical signals. This may mitigate the optical reflection penalty in the optical link and may increase the resilience of the optical link to optical cross-talk between the downstream and upstream optical signals.

In an embodiment, the drive signal is arranged to cause the reflective semi-conductor optical amplifier additionally to amplify the upstream optical signal.

In an embodiment, the phase modulation comprises a phase chirp applied to light pulses of the upstream optical signal. Applying a phase chirp to the upstream optical signal results in the upstream signal not being coherent with the downstream signal, which may mitigate the optical reflection penalty in an optical link in which the signals propagate. At low bit-rates, such as the 1.25 Gb/s rate used in a PON, the chirp introduces no significant chromatic dispersion penalty on the upstream optical signal.

In an embodiment, the phase chirp is proportional to the derivative of an optical power of a respective light pulse of the upstream optical signal. Each logical "1" in the return-to-zero line coded upstream signal undergoes two optical power transitions and therefore a positive and negative phase chirp is applied to each "1" bit. The upstream optical signal may therefore be made to be highly chirped, with a significantly reduced coherence time.

In an embodiment, the reflective semi-conductor optical amplifier has an optical confinement factor of at least 4. A large optical confinement factor results in the reflective semi-conductor optical amplifier applying a large phase chirp to the upstream "1" bits.

In an embodiment, the downstream optical signal comprises one of a continuous wave optical signal and an inversereturn-to-zero line coded optical signal. The optical network unit may therefore be remotely seeded by a CW optical signal or may be used with the RZ/IRZ remodulation technique reported by Presi et al (ibid) to greatly enhance the performance of a WDM PON.

In an embodiment, the downstream optical signal comprises an inverse-return-to-zero line coded optical signal and the drive signal is arranged to cause the reflective semi-conductor optical amplifier to apply a return-to-zero line code to said portion of the downstream optical signal to remodulate it to form an upstream optical signal at the signal wavelength.

In an embodiment, the inverse-return-to-zero line coded optical signal comprises dark pulses having a duty cycle of approximately fifty percent.

In an embodiment, the reflective semiconductor optical amplifier is operable on receipt of a dark pulse having a pulse leading edge and a pulse tail to suppress the dark pulse tail to form a logical zero for the upstream optical signal or to amplify the dark pulse tail to form a logical one, and is operable on receipt of a light pulse to suppress one-half of the pulse to form a logical one or to suppress the whole pulse to form a logical zero.

In an embodiment, the optical network unit further comprises signal synchronization apparatus arranged to interleave the return-to-zero line coded upstream optical signal by one-half bit with respect to the inverse-return-to-zero line coded downstream optical signal. In an embodiment, the signal synchronization apparatus comprises a clock and data recovery apparatus arranged to receive a further portion of the downstream optical signal and to recover the clock signal from the downstream optical signal.

A second aspect of the invention provides a passive optical network comprising an optical line terminal, an optical network unit and an optical link. The optical line terminal comprises an optical transmitter arranged to generate a downstream optical signal having a signal wavelength. The optical network unit is as described above. The optical link is coupled between the optical line terminal and the optical network unit and is arranged to transmit downstream and upstream optical signals therebetween.

Applying a phase modulation to the upstream optical signal causes the frequency of the upstream optical signal to vary, resulting in the upstream optical signal not being coherent with the downstream optical signal. This may mitigate the optical reflection penalty in the optical link and may increase the resilience of the optical link to optical cross-talk between the downstream and upstream optical signals.

A third aspect of the invention provides a method of transmitting data in a passive optical network. The method comprises the steps of: receiving a portion of a downstream optical signal having a signal wavelength at a reflective semi-conductor optical amplifier having a large optical confinement factor; and driving the reflective semi-conductor optical amplifier to apply a return-to-zero line code to said portion of a downstream optical signal to form an upstream optical signal at the signal wavelength and to apply a phase modulation to the upstream optical signal.

Driving the reflective semiconductor optical amplifier to apply a phase modulation to the upstream optical signal reduces the coherence time of the upstream optical signal. Any reflections, such as Rayleigh back-scattering, generated in an optical link in which the downstream and upstream optical signals propagate will therefore interfere incoherently with the downstream and upstream optical signals. This may mitigate the optical reflection penalty in the optical link and may increase the resilience of the optical link to optical crosstalk between the downstream and upstream optical signals.

In an embodiment, the downstream optical signal comprises one of a continuous wave optical signal and an inverse-return-to-zero line coded optical signal. Remote seeding by a CW optical signal may be implemented or the method may be used with the RZ/IRZ remodulation technique reported by Presi et al (ibid) to greatly enhance the performance of a WDM PON.

In an embodiment, the reflective semi-conductor optical amplifier is driven to apply a phase modulation comprising a phase chirp to light pulses of the upstream optical signal.

In an embodiment, the phase chirp is proportional to the derivative of an optical power of a respective light pulse of the upstream optical signal. Each logical "1" in the return-to-zero line coded upstream signal undergoes two optical power transitions and therefore a positive and negative phase chirp is applied to each "1" bit. The upstream optical signal may therefore be made to be highly chirped, with a significantly reduced coherence time.

A fourth aspect of the invention provides a data carrier having computer readable instructions embodied therein for providing access to resources available on a processor. The computer readable instructions comprise instructions to cause the processor to generate a drive signal to drive a reflective semi-conductor optical amplifier. The drive signal is arranged to cause the reflective semi-conductor optical amplifier to apply a return-to-zero line code to said portion of a downstream optical signal to form an upstream optical signal at the signal wavelength and to apply a phase modulation to the upstream optical signal.

The data carrier may comprise an electrical or optical signal, such that the data may be downloaded from a remote location, an electronic memory device or an electronic data storage medium.

In an embodiment, the computer readable instructions comprise instructions to cause the processor to generate a drive signal to drive the reflective semi-conductor optical amplifier to apply a phase modulation comprising a phase chirp to light pulses of the upstream optical signal.

In an embodiment, the phase chirp is proportional to the derivative of an optical power of a respective light pulse of the upstream optical signal.

DETAILED DESCRIPTION

Figure 1:
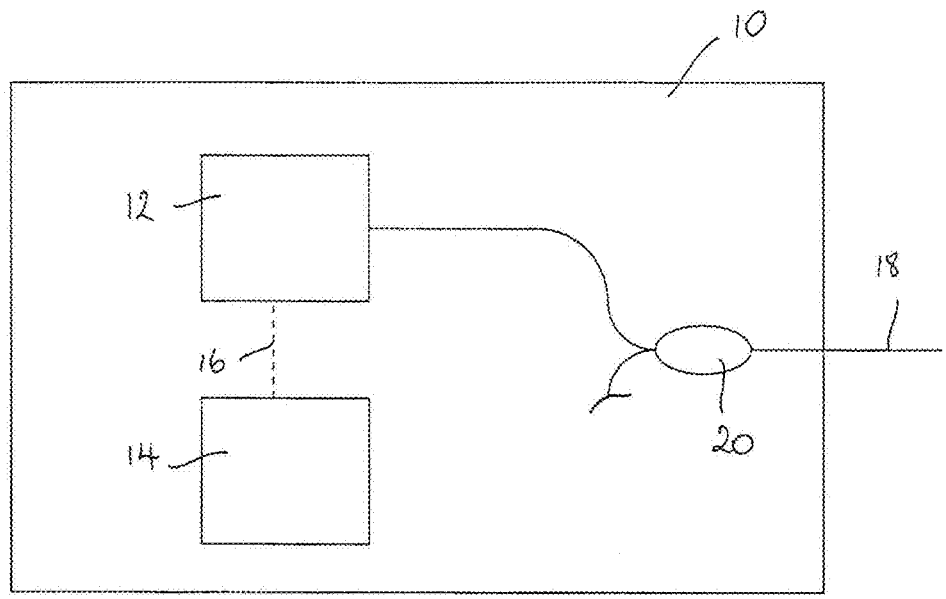
FIG. 1 is a schematic representation of an optical network unit according to a first embodiment of the invention.

A first embodiment of the invention provides an optical network unit 10 as shown in FIG. 1.

The optical network unit (ONU) 10 comprises a reflective semi-conductor optical amplifier (R-SOA) 12 and a driver 14 arranged to generate a drive signal 16 to drive the R-SOA 12.

The R-SOA 12 has a large optical confinement factor and is arranged to receive a portion of a downstream optical signal. In this example, the downstream optical signal is delivered to an optical input 18 of the ONU 10 and a portion of the downstream optical signal is routed to the R-SOA by an optical splitter 20. The downstream optical signal has a signal wavelength and a signal power.

The drive signal 16 is arranged to cause the R-SOA 12 to operate in saturation at the signal power. The driver 14 is arranged to generate the drive signal 16 to cause the R-SOA 12 to apply a return-to-zero (RZ) line code to the portion of the downstream optical signal received at the R-SOA 12 to form an upstream optical signal at the signal wavelength. The driver 14 is also arranged to generate the drive signal 16 to cause the R-SOA 12 to apply a phase modulation to the upstream optical signal.

Figure 2:
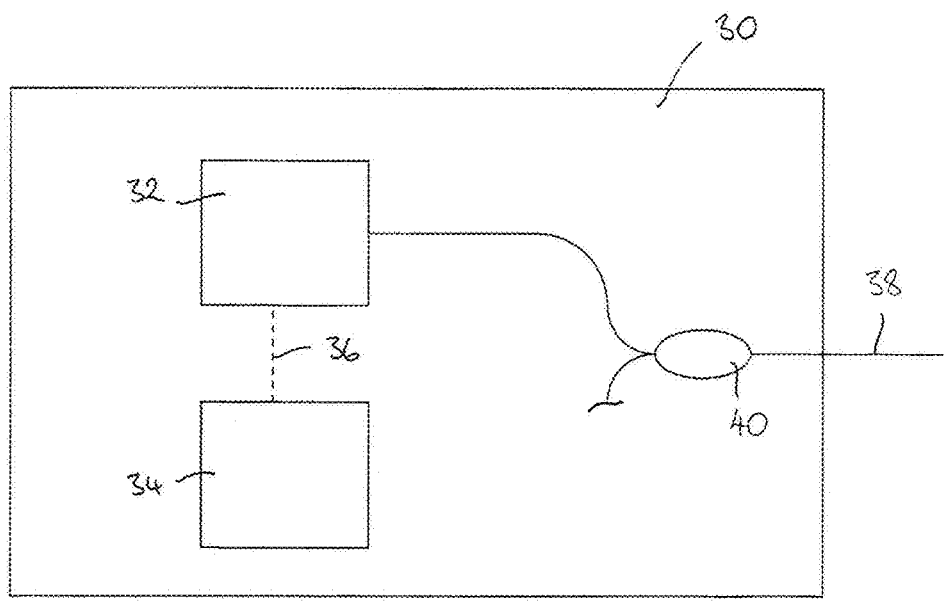
FIG. 2 is a schematic representation of an optical network unit according to a second embodiment of the invention.

An optical network unit 30 according to a second embodiment of the invention is shown in FIG. 2.

The ONU 30 comprises an R-SOA 32 and a driver 34 arranged to generate a drive signal 36. The R-SOA 32 has a large optical confinement factor, in this example a confinement factor of 4, and is arranged to receive a portion of a downstream optical signal. The downstream optical signal is received at an optical input 38 and a portion of the downstream optical signal is routed to the R-SOA 32 via an optical splitter 40. The downstream optical signal may comprise a continuous wave (CW) optical signal or may comprise an inverse-return-to-zero (IRZ) line coded optical signal. The downstream optical signal has a signal wavelength and a signal power.

The driver 34 is arranged to generate a drive signal 36 to cause the R-SOA 32 to operate in saturation at the signal power. The drive signal 36 is also arranged to cause the R-SOA 32 to apply an RZ line code to the portion of the downstream optical signal to form an upstream optical signal at the signal wavelength.

The driver is further arranged to generate a drive signal to drive the R-SOA 32 to cause the R-SOA to apply a phase chirp to the logical "1" bits of the upstream RZ optical signal.

Due to gain-phase coupling in the R-SOA 32, a CW optical signal modulated by the R-SOA 32 has a corresponding phase modulation applied to it, given by $$\phi(t) = \frac{-\alpha_{\mathit{eff}}}{2}\ln(\Delta G(t))$$

where $-\alpha_{\mathit{eff}}$ is the linewidth enhancement factor of the SOA.

As the gain of the R-SOA 32 is dependent upon the drive signal applied to the R-SOA, driving the R-SOA 32 with an RZ signal will result in two opposite phase transitions at each logical 1 bit, producing an upstream RZ line coded optical signal in which each logical 1 has a positive and a negative phase chirp applied to it, resulting in a highly chirped upstream optical signal. Since the amount of chirp is proportional to the derivative of the drive signal, driving with an RZ line code ensures that the upstream optical signal is continually phase chirped.

At low bit rates, such as the 1.25 Gb/s bit rate typical of a passive optical network, the resulting chirp applied to the upstream optical signal introduces no significant chromatic dispersion penalty. An RZ line coded upstream optical signal is thereby produced which has a periodic phase variation, which effectively reduces the coherence time of the upstream optical signal. Applying a phase chirp to the upstream optical signal in this way significantly reduces the coherence time of the upstream optical signal, meaning that any reflections generated in an optical link, such as Rayleigh back-scattering, will interfere with the upstream optical signal incoherently, improving the resilience of the optical link to optical crosstalk.

Figure 4:
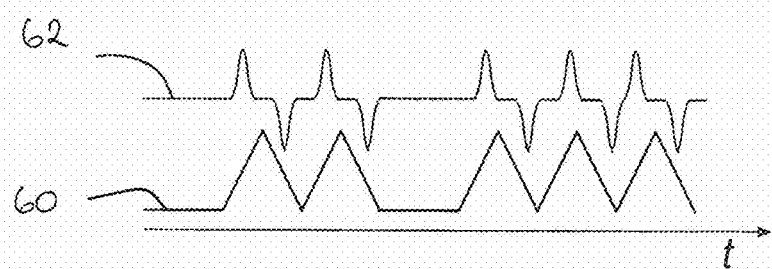
FIG. 4 shows (a) the phase modulation (upper line) applied to a return-to-zero (RZ) line coded upstream data signal by the R-SOA of the optical network unit of FIG. 3, and (b) the intensity modulation of the RZ line coded upstream data signal.

FIG. 4 shows an RZ line coded upstream optical signal 60 and the corresponding phase modulation 62 applied to the RZ upstream optical signal.

Figure 3:
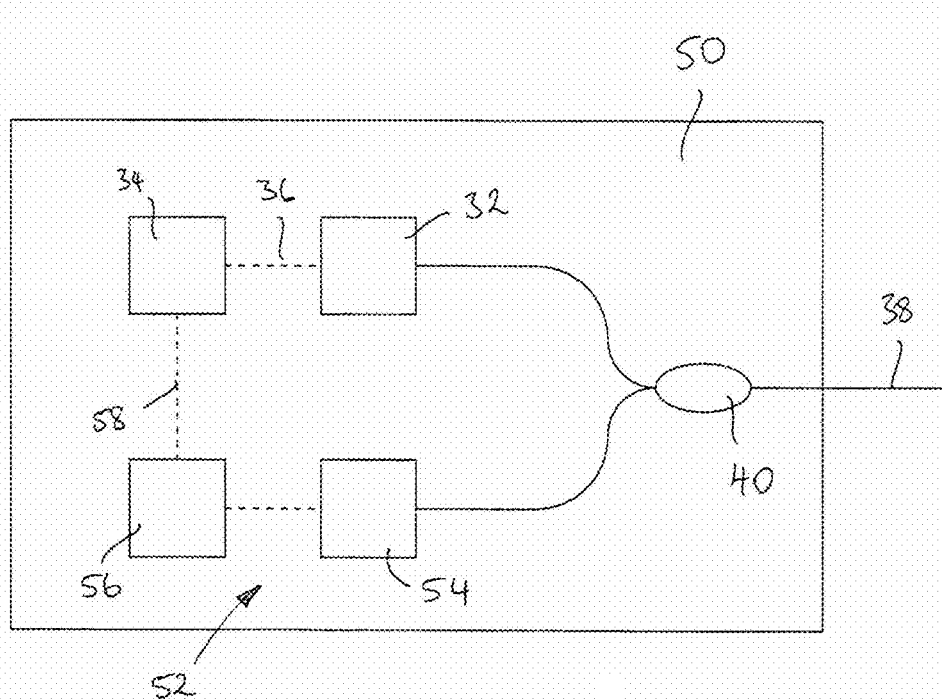
FIG. 3 is a schematic representation of an optical network unit according to a third embodiment of the invention.

An optical network unit 50 according to a third embodiment of the invention is shown in FIG. 3. The ONU 50 of this embodiment is substantially the same as the ONU of FIG. 2, with the following modifications. The same reference numbers are retained for corresponding features.

In this embodiment, the downstream optical signal comprises an IRZ line coded optical signal and the ONU 50 further comprises synchronisation apparatus 52. The synchronization apparatus 52 comprises an optical detector 54 and a clock and data to recovery unit (CDR) 56.

A portion of the downstream optical signal is routed via the optical splitter to the R-SOA 32 and a further portion of the downstream optical signal is routed via the optical splitter 40 to the optical detector 54. The CDR 56 recovers the clock signal from the detected downstream optical signal and provides the clock signal 58 to the driver 34.

The driver 34 is arranged to generate a drive signal to cause the R-SOA 32 to apply an RZ line code to the portion of the downstream optical signal to form an upstream optical signal which is interleaved by one half bit with respect to the IRZ downstream optical signal.

Figure 5:
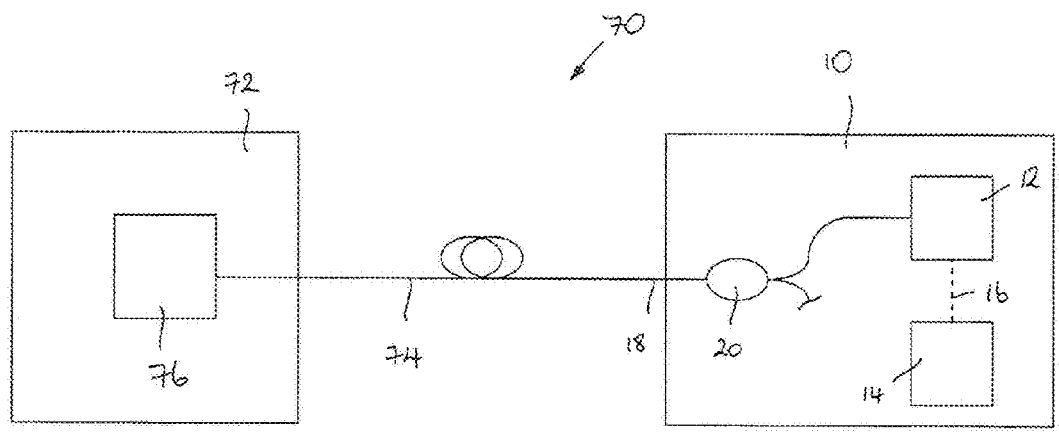
FIG. 5 is a schematic representation of a passive optical network according to a fourth embodiment of the invention.

FIG. 5 shows a passive optical network 70 according to a fourth embodiment of the invention. The passive optical network (PON) 70 comprises an optical line terminal (OLT) 72, an ONU 10 as shown in FIG. 1, and an optical link 74.

The OLT 72 comprises an optical transmitter 76 arranged to generate a downstream optical signal having a signal wavelength and a signal power.

The optical link 74 is coupled between the OLT 72 and the ONU 10 and is arranged to transmit downstream and upstream optical signals between the OLT 72 and the ONU 10.

Figure 6:
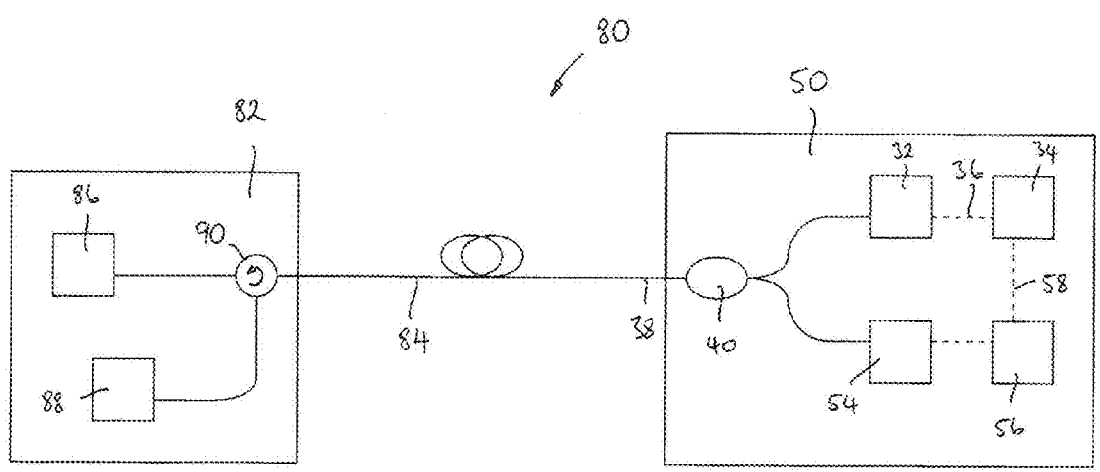
FIG. 6 is a schematic representation of a passive optical network according to a fifth embodiment of the invention.

A PON 80 according to a fifth embodiment of the invention is shown in FIG. 6. The PON 80 comprises an OLT 82, an ONU 50 as shown in FIG. 3, and an optical link 84.

The OLT 82 comprises an optical transmitter 86 and an optical receiver 88. The optical transmitter 86 is arranged to generate an IRZ line coded downstream optical signal which is coupled to the optical link 84 via an optical circulator 90. The optical receiver 88 is arranged to receive an RZ line coded upstream optical signal and is coupled to the optical link 84 via the optical circulator 90.

The optical link 84 is coupled between the OLT 82 and the ONU 50 and is arranged to transmit downstream and upstream optical signals between the OLT 82 and the ONU 50.

The construction and operation of the ONU 50 is as described in connection with FIG. 3 above. It will be appreciated however that the ONU 30 of FIG. 2 may alternatively be used.

Figure 7:
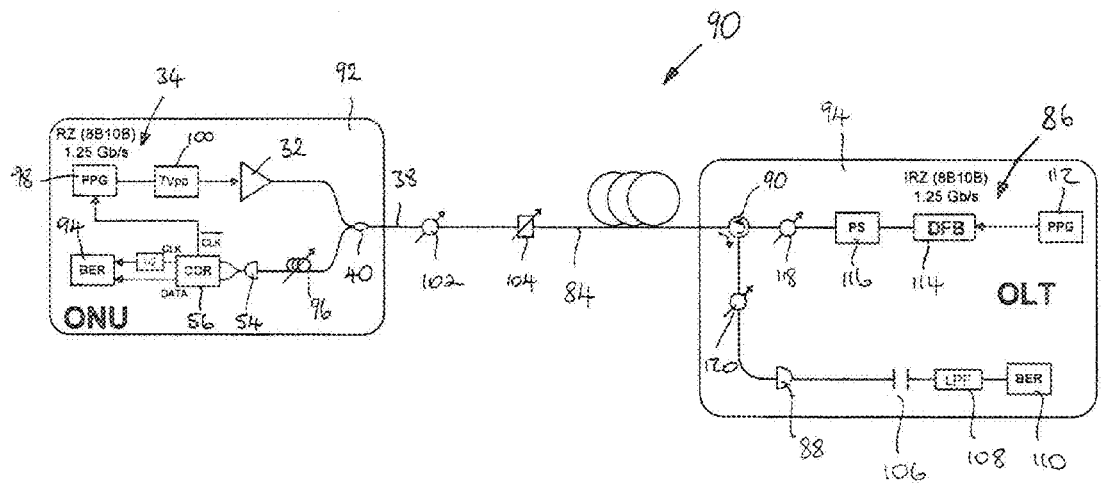
FIG. 7 is a schematic representation of a passive optical network according to a sixth embodiment of the invention.

A PON 90 according to sixth embodiment of the invention is shown in FIG. 7. The PON 90 is substantially the same as the PON 80 of FIG. 6, with the following modifications. The same reference numbers are retained for corresponding features.

In this embodiment, the ONU 92 further comprises a bit error rate (BER) unit 94 to analyse the received downstream optical signal and an optical delay line 96. The driver 34 comprises a pulse pattern generator (PPG) 98 arranged to generate an RZ data signal comprising a pseudo random bit sequence (PRBS) having 8b10b line coding. The driver 34 also comprises a 7 volt peak to peak electrical signal generator 100 which generates the drive signal for the R-SOA 32.

The optical link 84 is provided with a variable optical attenuator 102 and a tunable optical filter 104 having a 0.8 nm linewidth. The optical link 84 comprises 26 km of single mode fibre (SMF).

In this embodiment the optical detector 88 in the OLT 94 is followed by a DC signal block 106 and a low pass filter 108, and a BER unit 110 for analysis of the detected upstream optical signal.

The optical transmitter 86 comprises a pulse pattern generator (PPG) 112 arranged to drive a DFB laser 114 with an IRZ line coded drive signal comprising a 1.25 Gb/s 8b10b line coded PRBS. The resulting IRZ line coded downstream optical signal is transmitted via a polarisation scrambler (PS) 116 and a variable optical attenuator 118 to the optical circulator 90 for coupling into the optical link 84. The polarisation scrambler 116 is arranged to randomly rotate the signal polarization at a frequency of 6 kHz.

A variable optical attenuator 120 is provided between the optical circulator 90 and the optical detector 88.

The PON 90 of FIG. 7 has been used to investigate the crosstalk mitigation performance of the ONU 92, as follows.

At the OLT the DFB laser 114 was directly modulated by an IRZ sequence at 1.25 Gb/s, using an 8b10b line coded $2^{11-1}$ PRBS, to emulate a GbE data stream. The resulting IRZ modulated optical signal was passed through the polarisation scrambler 116 which randomly rotated the signal polarisation at a frequency of 6 kHz. The variable optical attenuators 102, 118 were used to set the signal-to-crosstalk ratio at the OLT upstream receiver 88. In this configuration the crosstalk contribution is provided mainly by Rayleigh back-scattered (RBS) light from the downstream optical signal. The optical link 84 used here had an RBS return loss of approximately −34 dB. The variable optical attenuator 118 was used to set the RBS crosstalk power and the variable optical attenuator 102 was used to set the upstream optical signal power.

At the ONU 92 the downstream optical signal was power split by the optical splitter 40 and routed to the optical receiver 54 and the R-SOA 32. The ONU receiver comprises an avalanche photo detector (APD) 54 and a CDR unit 56. The recovered clock signal was used to assess the downstream optical signal performance and to provide synchronization for the upstream optical signal.

The upstream RZ signal was an inverted logic copy of the downstream IRZ signal.

Figure 8:
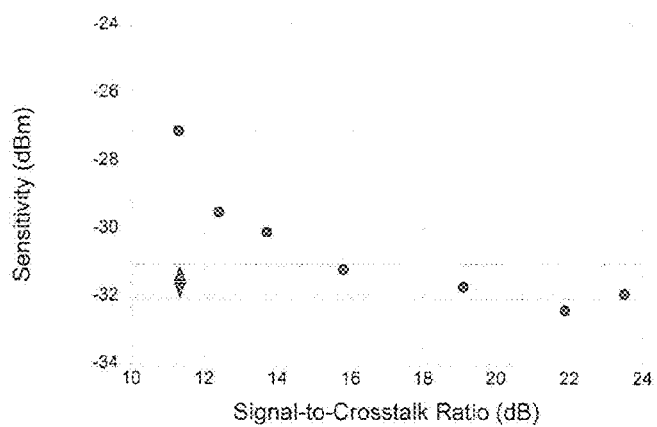
FIG. 8 shows upstream receiver sensitivity (dBm) as a function of signal-to-crosstalk ratio (dB) for the passive optical network of FIG. 7.

FIG. 8 shows the optical penalty recorded at various crosstalk levels at the upstream receiver 88. As can be seen, a 1 dB power penalty is recorded for a signal to crosstalk ratio of about 15 dB. This is a significant result for a bi-directional PON where a significant outage should be expected at signal to crosstalk ratio levels of about 25 dB.

Figure 9:
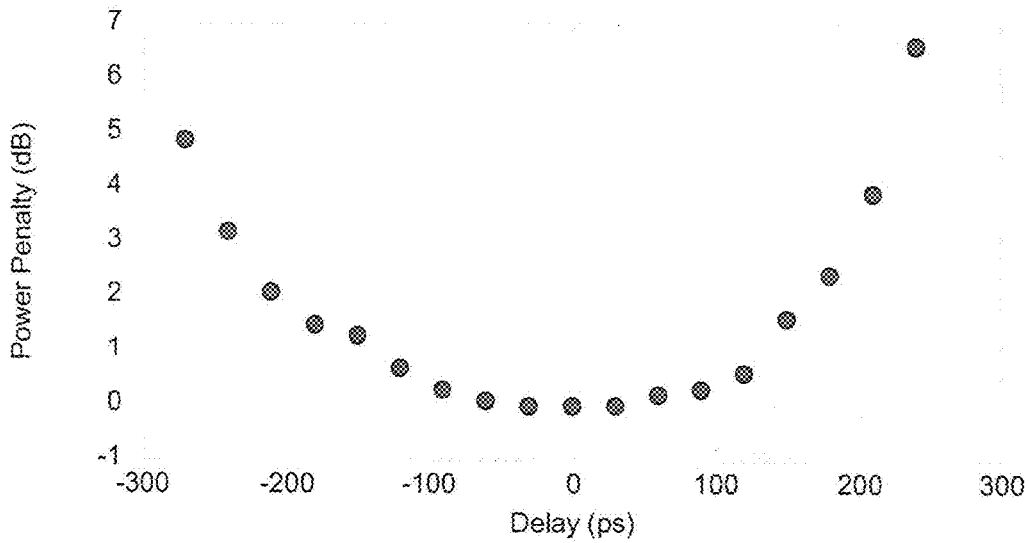
FIG. 9 shows power penalty (dB) as a function of synchronization delay (ps) for the passive optical network of FIG. 7.

The resilience of the PON 90 to synchronization errors between the downstream and upstream optical signals was investigated and the measurement of the penalty recorded at the OLT receiver 88 for a synchronisation mismatch between the downstream and upstream signals is shown in FIG. 9. As can be seen, 300 ps synchronisation errors result in less than 1 dB of optical power penalty at the OLT receiver.

Figure 10:
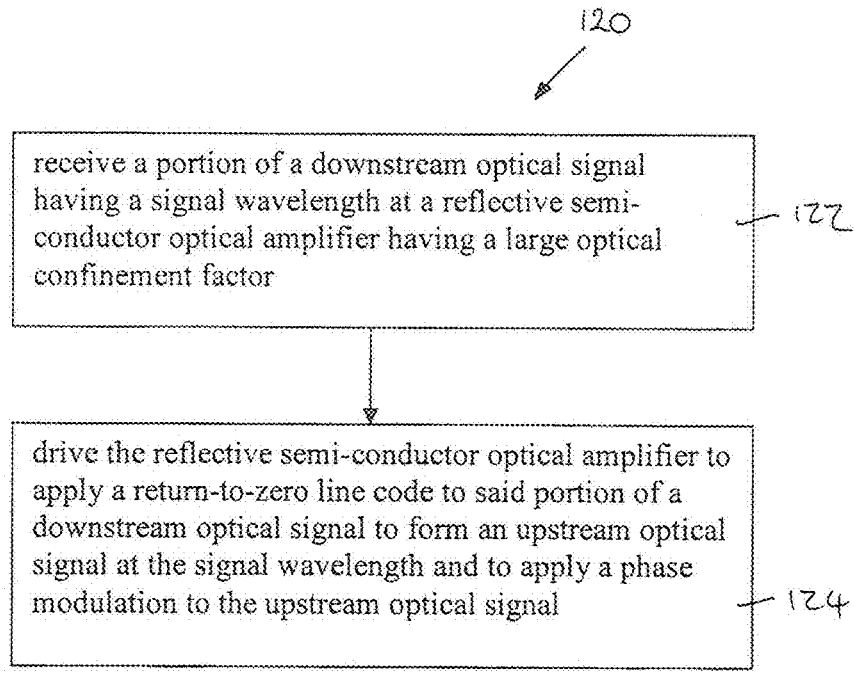
FIG. 10 shows the steps of a method of transmitting data in a passive optical network according to a seventh embodiment of the invention.

A seventh embodiment of the invention provides a method 120 of transmitting data in a passive optical network. The steps of the method are shown in FIG. 10.

The method 120 comprises:
Receiving a portion of a downstream optical signal having a signal wavelength at an R-SOA having a large optical confinement factor 122; and
Driving the R-SOA to apply an RZ line code to the received portion of the downstream optical signal to form an upstream optical signal at the signal wavelength 124. The R-SOA is driven to apply a phase modulation to the upstream optical signal 124.

The downstream optical signal may comprise a CW optical signal or an IRZ line coded optical signal.

Figure 11:
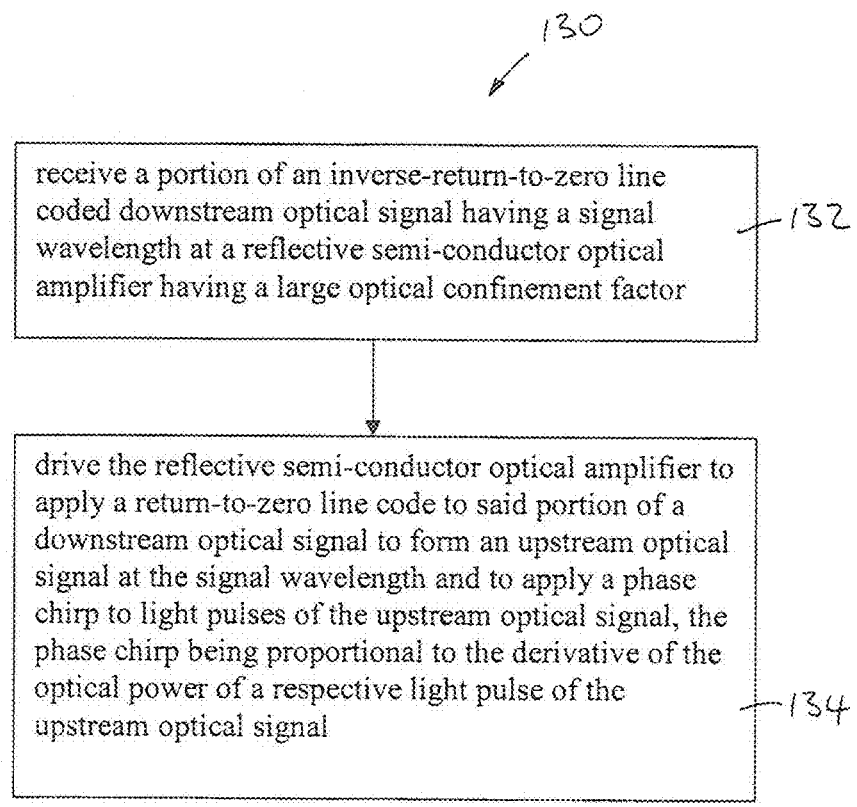
FIG. 11 shows the steps of a method of transmitting data in a passive optical network according to an eighth embodiment of the invention.

FIG. 11 shows the steps of a method 130 of transmitting data in a passive optical network.

The method 130 comprises:
Receiving a portion of an IRZ line coded downstream optical signal having a signal wavelength at an R-SOA having a large optical confinement factor 132; and
Driving the R-SOA to apply an RZ line code to the portion of the downstream optical signal to form an upstream optical signal at the signal wavelength 134. The method further comprises driving the R-SOA to apply a phase chirp to light pulses of the upstream optical signal. The phase chirp is proportional to the derivative of the optical power of a respective light pulse of the upstream optical signal.

The invention claimed is:

1. An optical network unit comprising: a reflective semi-conductor optical amplifier having an optical confinement factor and being arranged to receive a portion of a downstream optical signal having a signal wavelength and a signal power; and a driver arranged to generate a drive signal to drive the reflective semi-conductor optical amplifier, the drive signal being arranged to cause the reflective semi-conductor optical amplifier to operate in saturation at the signal power and to cause the reflective semi-conductor optical amplifier to apply a return-to-zero line code to said portion of the downstream optical signal to form an upstream optical signal at the signal wavelength and to apply a phase modulation to the upstream optical signal.

2. An optical network unit as claimed in claim 1, wherein the phase modulation comprises a phase chirp applied to light pulses of the upstream optical signal.

3. An optical network unit as claimed in claim 2, wherein the phase chirp is proportional to the derivative of an optical power of a respective light pulse of the upstream optical signal.

4. An optical network unit as claimed in claim 1, wherein the reflective semi-conductor optical amplifier has an optical confinement factor of at least 4.

5. An optical network unit as claimed in claim 1 wherein, the downstream optical signal comprises one of a continuous wave optical signal and an inverse-return-to-zero line coded optical signal.

6. An optical network unit as claimed in claim 5, wherein the downstream optical signal comprises an inverse-return-to-zero line coded optical signal and the drive signal is arranged to cause the reflective semi-conductor optical amplifier to apply a return-to-zero line code to said portion of the downstream optical signal to remodulate it to form an upstream optical signal at the signal wavelength.

7. An optical network unit as claimed in claim 6, wherein the optical network unit further comprises signal synchronization apparatus arranged to interleave the return-to-zero line coded upstream optical signal by one-half bit with respect to the inverse-return-to-zero line coded downstream optical signal.

8. A passive optical network comprising: an optical line terminal comprising an optical transmitter arranged to generate a downstream optical signal having a signal wavelength; an optical network unit comprising: a reflective semi-conductor optical amplifier having an optical confinement factor and being arranged to receive a portion of a downstream optical signal having a signal wavelength and a signal power; and a driver arranged to generate a drive signal to drive the reflective semi-conductor optical amplifier, the drive signal being arranged to cause the reflective semi-conductor optical amplifier to operate in saturation at the signal power and to cause the reflective semi-conductor optical amplifier to apply a return-to-zero line code to said portion of the downstream optical signal to form an upstream optical signal at the signal wavelength and to apply a phase modulation to the upstream optical signal; and an optical link coupled between the optical line terminal and the optical network unit and arranged to transmit downstream and upstream optical signals.

9. A method of transmitting data in a passive optical network, the method comprising: receiving a portion of a downstream optical signal having a signal wavelength at a reflective semi-conductor optical amplifier having an optical confinement factor; and driving the reflective semi-conductor optical amplifier to apply a return-to-zero line code to said portion of a downstream optical signal to form an upstream optical signal at the signal wavelength and to apply a phase modulation to the upstream optical signal.

10. A method as claimed in claim 9, wherein the downstream optical signal comprises one of a continuous wave optical signal and an inverse-return-to-zero line coded optical signal.

11. A method as claimed in claim 9, wherein the reflective semi-conductor optical amplifier is driven to apply a phase modulation comprising a phase chirp to light pulses of the upstream optical signal.

12. A method as claimed in claim 11, wherein the phase chirp is proportional to the derivative of an optical power of a respective light pulse of the upstream optical signal.

13. A non-transitory computer readable medium having computer readable instructions embodied therein for providing access to resources available on a processor, the computer readable instructions comprising instructions to cause the processor to receive a portion of a downstream optical signal having a signal wavelength, wherein said portion of a downstream optical signal is received at a reflective semi-conductor optical amplifier having an optical confinement factor, and generate a drive signal to drive said reflective semi-conductor optical amplifier to apply a return-to-zero line code to said portion of a downstream optical signal to form an upstream optical signal at the signal wavelength and to apply a phase modulation to the upstream optical signal.

14. A non-transitory computer readable medium as claimed in claim 13, wherein the computer readable instructions comprise instructions to cause the processor to generate a drive signal to drive the reflective semi-conductor optical amplifier to apply a phase modulation comprising a phase chirp to light pulses of the upstream optical signal.

15. A non-transitory computer readable medium as claimed in claim 14, wherein the phase chirp is proportional to the derivative of an optical power of a respective light pulse of the upstream optical signal.

* * * * *